Figure 1:
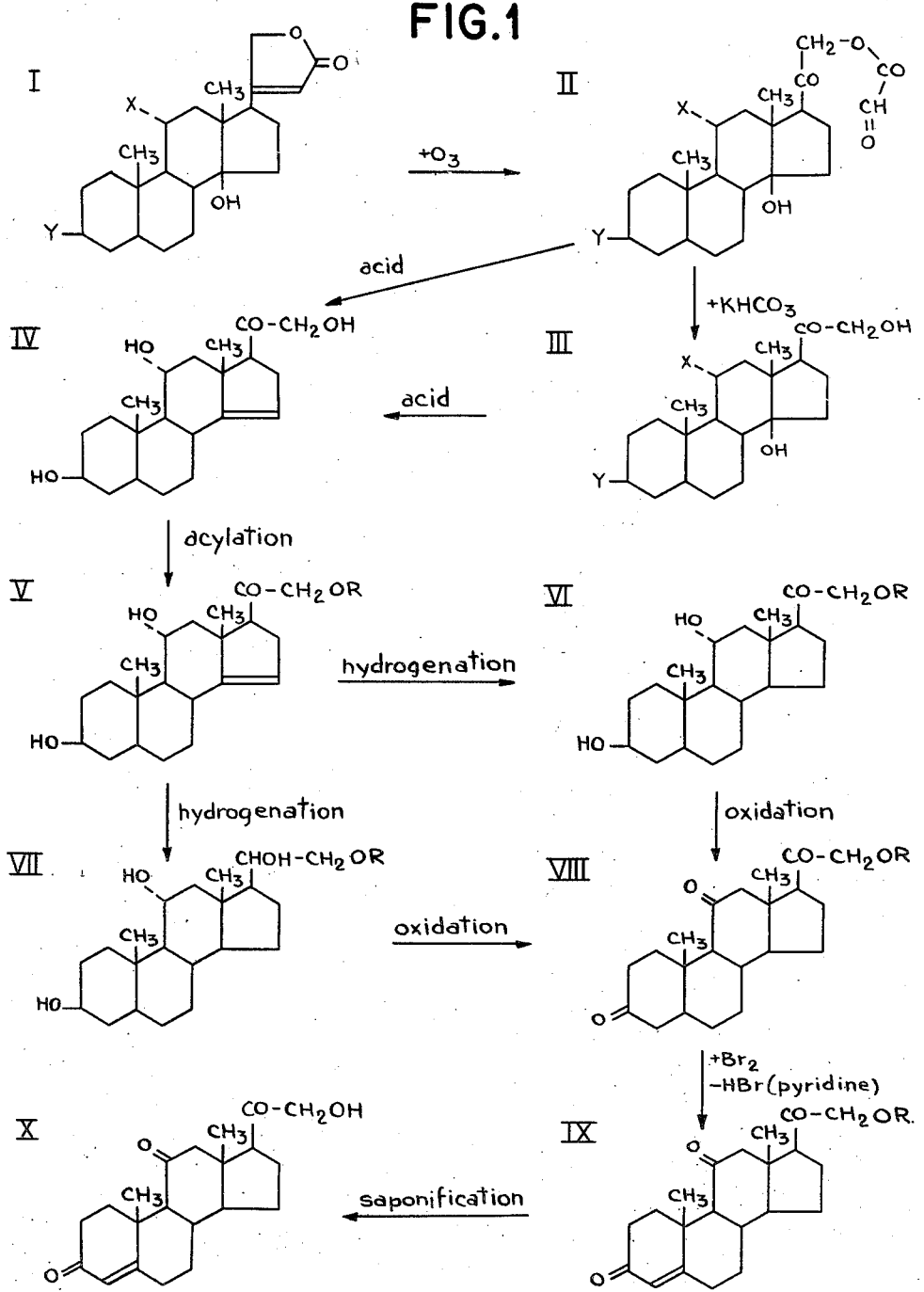

Nov. 12, 1957 — T. REICHSTEIN — 2,813,107
PREGNANE COMPOUNDS AND A PROCESS OF MAKING SAME
Filed Dec. 8, 1954 — 3 Sheets-Sheet 1

INVENTOR
TADEUS REICHSTEIN
ATTORNEYS

Nov. 12, 1957 T. REICHSTEIN 2,813,107
PREGNANE COMPOUNDS AND A PROCESS OF MAKING SAME
Filed Dec. 8, 1954

INVENTOR
TADEUS REICHSTEIN

ATTORNEYS

Nov. 12, 1957

T. REICHSTEIN 2,813,107

PREGNANE COMPOUNDS AND A PROCESS OF MAKING SAME

Filed Dec. 8, 1954

3 Sheets-Sheet 3

INVENTOR:
TADEUS REICHSTEIN

ATTORNEYS

United States Patent Office 2,813,107
Patented Nov. 12, 1957

2,813,107

PREGNANE COMPOUNDS AND A PROCESS OF MAKING SAME

Tadeus Reichstein, Basel, Switzerland, assignor to Organon Inc., Orange, N. J., a corporation of New Jersey Application December 8, 1954, Serial No. 474,014

Claims priority, application Netherlands September 13, 1947

5 Claims. (Cl. 260—397.45)

This invention relates to pregnane compounds and more particulary to pregnane compounds having an oxygen containing group at their carbon atom 11, and to a process of making same.

This application is a continuation-in-part of my copending application Serial No. 254,880, filed November 5, 1954, now U. S. Patent 2,773,076, relating to a Process of Preparing Compounds Having Adreno-cortical Hormone Activity, which application is in turn a continuation-in-part of my application Serial No. 47,052, filed August 31, 1948, now abandoned.

The object of this invention is to produce valuable physiologically active compounds for therapeutic application such as corticosterone, 11-dehydro-corticosterone, 17-hydroxy-corticosterone, and 17-hydroxy-11-dehydro-corticosterone and their esters. These compounds are of special value in the treatment of adrenal insufficiencies and the last mentioned compound has proven to be of great value in the treatment of rheumatoid arthritis.

A further object of the invention is to produce such compounds in large quantities by a simple and efficient process, prior processes having proven to be complicated, of lower yield and restricted to use of glandular extracts.

It has been found that dehydro-11-corticosterone or corticosterone or other steroids having an oxygen linkage at the carbon atom 11 can be easily obtained by starting from sarmentogenine, sarmentocymarine, or sarnovid, which compounds are readily isolated and prepared, in a relatively simple way, from seeds of certain Strophanthus plant varieties suitable to that purpose.

These compounds and derivatives therefrom, which are part of this invention, correspond to the following formula:

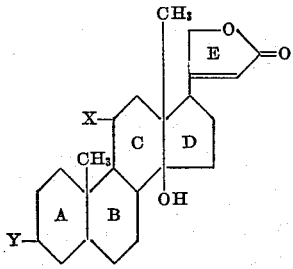

X and Y represent hydroxyl groups, or groups convertible by hydrolysis into hydroxyl groups, such as ester, ether, glycosido groups, or keto groups, or groups convertible by hydrolysis into keto groups, such as oximo, semicarbazono, hydrazino and the like groups, enolic groups and the like. As starting materials, derived from such seed, having the above structure, the following are useful and important:

Sarmentogenine (X and Y: Hydroxyl),
Sarmentogenine monoesters (X: acyloxy group when Y: hydroxyl, or vice versa), such as sarmentogenine-3-monoacetate, sarmentogenine-3-monopropionate, 3-carbomethoxy sarmentogenine, 3-carbobenzoxy sarmentogenine, 3-carboethoxy sarmentogenine, sarmentogenine-3-n-valerianate, sarmentogenine-11-monoacetate, sarmentogenine-11-monobenzoate;

Sarmentogenine diesters (X and Y: the same or different acyloxy groups), such as sarmentogenine diacetate, diformiate, di-(carmobethoxy) sarmentogenine, di-(carbethoxy) sarmentogenine, di-(carbobenzoxy) sarmentogenine, sarmentogenine dibenzoate, sarmentogenine di-n-valerianate, 11-carbobenzoxy sarmentogenine-3-acetate, sarmentogenine di-trifluoro acetate;

Sarmentogenine monoethers (X: alkoxy, aryloxy, or aralkoxy group when Y: hydroxyl, or vice versa), such as diphenyl methoxy-3-sarmentogenine, triphenyl methoxy-3-sarmentogenine, benzyloxy-3-sarmentogenine;

Sarmentogenine diethers (X and Y: The same or different alkoxy, aryloxy, aralkoxy groups) such as di-(diphenyl methoxy sarmentogenine), di-(triphenylmethoxy) sarmentogenine, di-(methoxy) sarmentogenine; di-(benzyloxy) sarmentogenine;

Sarmentogenine ether esters (X: acyloxy group when Y. ether group and vice versa), such as sarmentogenine ether esters containing benzyl, diphenyl methyl, triphenyl methyl radicals;

Sarmentogenine glycosides, such as sarmentocymarine and sarnovid and derivatives thereof, such as sarmentocymarine-11-acetate, sarmentocymarine-11-benzoate, sarmentogenine-3-glucoside, 3,11-sarmentoso sarmentogenine, 11-benzyloxy sarmentocymarine acetate, 11-carbobenzoxy sarmentocymarine, 3-glucosido sarmentogenine-11- propionate;

Sarmentogenone (X and Y: keto groups)

Sarmentogenone keto derivatives (X and Y the same or different groups obtained on reacting a keto group with a ketone reagent, such as hydrazine, phenylhydrazine, p-nitro phenylhydrazine, dinitrophenylhydrazine, hydroxylamine, semicarbazide, thiosemicarbazide, phenyl semicarbazide, phenyl thiosemicarbazide, Girard reagents P and T and others;

3-hydroxy-11-keto sarmentogenine-like compounds and their esters, ethers, glycosides, and reaction products with ketone reagents, for instance, 11-keto-sarmentocymarine, 11-keto sarnovid;

3-keto-11-hydroxy sarmentogenine-like compounds and their esters and ethers, for instance, the 3-keto-11-monoacetate, 3-keto-11-monobenzoate, 3-keto-11-monoacetate, 3-keto-11-triphenyl methyl ether, 3-keto-11-monopropionate.

The process of converting sarmentogenine and its derivatives, and ketone compounds derived therefrom and their derivatives into compounds with adreno-cortical hormone activity comprises the following steps:

(1) Opening the double bond in ring E by oxidation to form a glyoxylic acid derivative.

(2) Saponifying said glyoxylic acid derivative to produce a ketol group at the carbon atom 17.

(3) Eliminating the tertiary hydroxyl group at the carbon atom 14 by splitting off water and formation of a double bond in ring D between the carbon atoms 14 and 15.

(4) Either before or after splitting off water from the carbon atoms 14 and 15, either the hydroxyl group in $C_{21}$-position or all the hydroxyl groups present at the carbon atoms 3, 11, and 21 are esterified or etherified.

(5) The double bond between the carbon atoms 14 and 15 is then hydrogenated to produce in ring D saturated compounds while at the same time keto groups present in the molecule are, at least partly, reduced to hydroxyl groups.

The $\Delta_{14,15}$-unsaturated as well as the saturated compounds obtained thereby represent valuable intermediate products which may be converted into adrenocortical hormones in the following manner.

Said intermediate compounds, upon oxidation, produce the corresponding triketo compounds. The triketo compounds by reduction to the corresponding hydroxy compounds, partial dehydrogenation of the hydroxyl group at the carbon atom 3, and introduction, by halogenation and splitting off of hydrogen halide, of a double bond between the carbon atoms 4 and 5, yield corticosterone and its 21-esters.

By oxidizing said saturated intermediate compounds and introducing directly a double bond between the carbon atoms 4 and 5, 11-dehydro corticosterone and its 21-esters are produced.

The $\Delta_{14,15}$-unsaturated intermediate compounds are directly oxidized to the triketo compounds whereafter the resulting unsaturated triketo compounds are reduced and partially dehydrogenated to convert the hydroxyl groups at the carbon atoms 3 and 20 into ketone groups. On introducing a double bond between the carbon atoms 4 and 5, by halogenation and splitting off of hydrogen halide, corticosterone and its 21-esters are obtained.

A hydroxyl group may be introduced in 17-position into said saturated intermediate products, for instance, by addition of hydrocyanic acid to the 20-keto-group, splitting off water, between the carbon atoms 17 and 20, reacting the resulting $\Delta_{17\cdot 20}$-unsaturated compound with osmium tetroxide to introduce a hydroxyl group at the carbon atom 17, oxidizing the osmium tetroxide reaction product to the 3,11,20-triketo-17,21-dihydroxy compound, and introducing a double bond between the carbon atoms 4 and 5 by halogenation and splitting off hydrogen halide. In this manner 17-hydroxy-11-dehydrocorticosterone, or cortisone is obtained.

As is evident herefrom, the $\Delta_{14,15}$-unsaturated as well as the corresponding saturated steroid compounds represent valuable intermediate products for the manufacture of steroid hormones characterized by an oxygen linkage in 11-position.

Ozone has been found to be the best oxidizing agent for carrying out the first step of the process according to this invention, namely to open the double bond in ring E. Splitting up the ozonide may be carried out by means of zinc dust and glacial acetic acid. Simple hydrolysis, however, may also be employed for said splitting up reaction. When using other oxidizing agents, such as lead tetraacylates, osmium tetroxide, hydrogen peroxide, or organic peracids such as peracetic acid, perbenzoic acid and the like, the yield is lower than with ozone.

Saponification according to the second step of the process of this invention may be carried out by an agent capable of hydrolyzing esters to the corresponding alcohols and acids. Alkaline as well as acid saponifying agents may be used. Thus, to saponify the glyoxylic acid ester obtained in the first step of the process, it may be boiled in alcoholic solution under addition of hydrochloric acid. Very good results are obtained when allowing the ester to stand for several hours in an aqueous-alcoholic solution of potassium bicarbonate at room temperature. Thereby, for instance, acetylated hydroxyl groups at the carbon atoms 3 and 11 remain unchanged while the glyoxylic acid ester is saponified.

To split off water from the hydroxyl group at carbon atom 14 and the neighboring methylene group of carbon atom 15, the reaction product is subjected to the action of an agent capable of splitting off water from a tertiary carbinol, such as phosphorus oxychloride, a mineral acid, such as hydrochloric acid, a salt of a carboxylic acid, such as silver acetate, potassium acetate and the like. For instance, by heating the saponification product with hydrochloric acid, preferably in alcoholic solution, the $\Delta_{14,15}$-compound is obtained. Treating the glyoxylic acid ester, obtained on ozonisation, with hydrochloric acid, causes not only saponification of said glyoxylic acid ester but also formation of the $\Delta_{14,15}$-double bond.

The acylation of the 21-hydroxyl group is carried out either before or after splitting off water from the 14-hydroxyl group. Acetic acid anhydride is utilized as an acylating agent. Other satisfactory acylating agents are acetyl chloride, propionic acid anhydride, benzoyl chloride, trimethyl acetyl chloride and others. An advantageous method of acylating consists in reacting the corresponding carboxylic acid halogenides or anhydrides with the hydroxyl compound whereby preferably alkaline substances capable of combining with and, thus, eliminating the halogen hydride formed, such as alkali hydroxide, or tertiary bases, such as diethylaniline, pyridine, or quinoline, are added to the acylation mixture.

The hydrogenation of the double bond between the carbon atoms 14 and 15 is preferably carried out by catalytic hydrogenation, for instance, with noble metal catalysts, such as platinum and palladium or with catalysts of the nickel or iron group.

The attached drawings illustrate the various steps of the process of this invention. According to said process, for instance, sarmentogenine (Fig. 1, Formula I; X and Y: HO-) or sarmentocymarine (Formula I; X: HO-; Y: cymarosido residue), or their ester and ether derivatives, for instance, sarmentogenine diacetate (Formula I; X and Y: CH$_3$.COO-) or dicarbobenzoxy sarmentogenine (Formula I; X and Y: C$_6$H$_5$CH$_2$OCOO-), or sarmentogenone (Formula I; X and Y: O=) are dissolved in a suitable solvent, preferably at temperatures between $-80°$ C. and $-20°$ C., oxygen or air containing ozone is passed through said solution until 1 mol of ozone is absorbed, the ozonide obtained is decomposed, preferably by means of hydrogen in statu nascendi. Thereby most probably a glyoxylic acid ester of Formula II is obtained. It is, however, not necessary to isolate said ester in the pure state. The crude reaction product is either carefully saponified, for instance, by means of potassium carbonate in aqueous methanol or by means of acids, so as to produce the 17-ketol compound of Formula III. By heating said ketone III (or by directly heating the glyoxylic acid ester II) with dilute mineral acids, preferably in alcoholic solution, the unsaturated ketol of Formula IV is obtained. It is unnecessary to isolate said ketol in the pure state but it is further worked up as crude product. By careful acylation, the 21-mono acyl derivative of Formula V is obtained wherein R indicates an acyl residue. Isolation of said acyl derivative is not necessary. It may be hydrogenated, for instance, in glacial acetic acid solution in the presence of platinum as a catalyst. Thereby either the saturated ketone of Formula VI or the saturated hydroxy compound of Formula VII or a mixture of both is obtained. Said compounds or their mixture are oxidized, for instance, by means of chromic acid to the corresponding triketo compound of formula VIII. On bromination and splitting off hydrogen bromide by means of pyridine, 11-dehydro corticosterone ester of Formula IX is obtained which is saponified to 11-dehydro corticosterone of Formula X.

Figure 2:
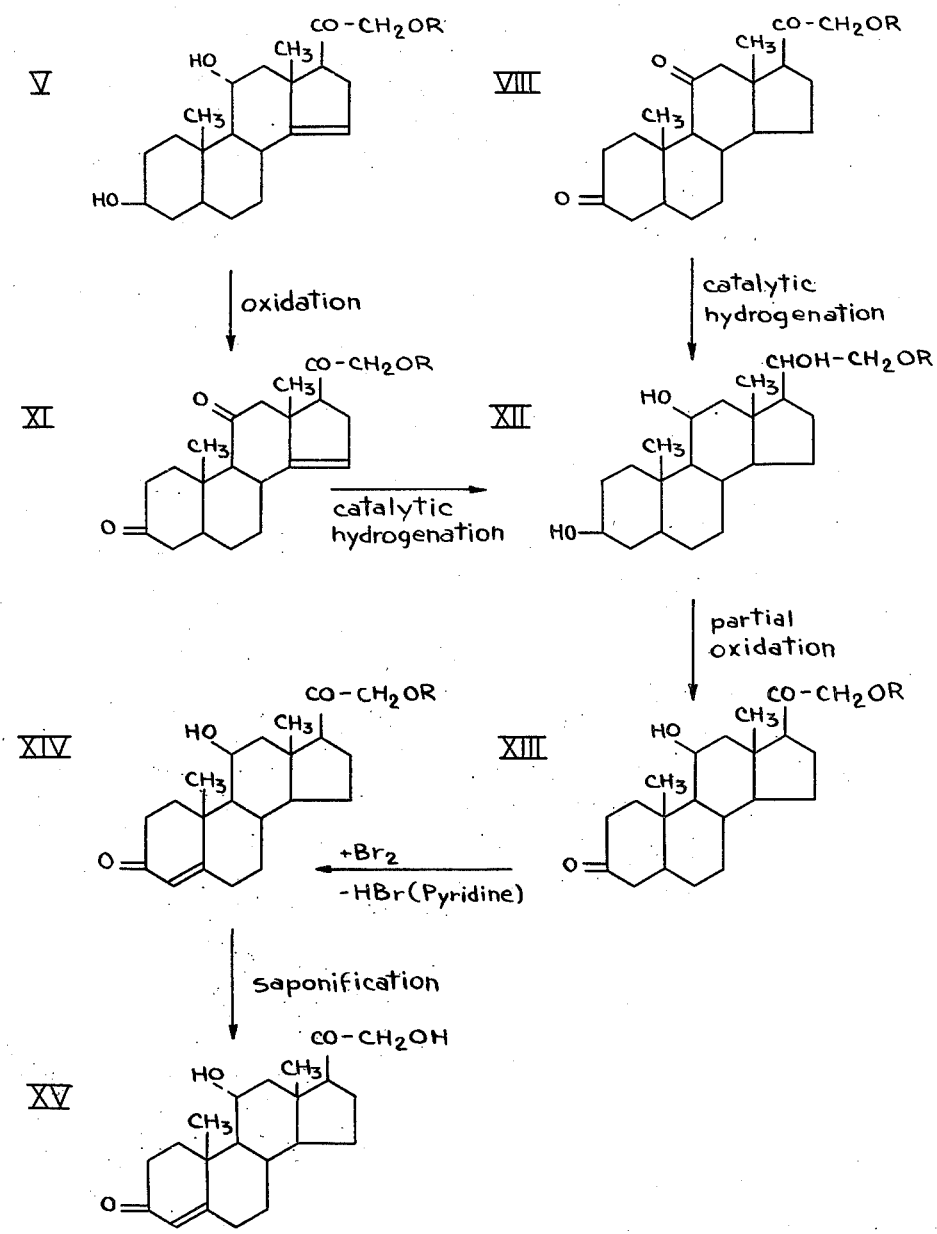

As illustrated in Fig. 2, the unsaturated ketol compound of Formula V may be oxidized, for instance, by means of chromic acid, to the corresponding unsaturated triketo compound of Formula XI which is then hydrogenated to the corresponding saturated 21-monoacylated tetrahydroxy compound of Formula XII, for instance, by catalytically activated hydrogen in the presence of a platinum catalyst. Said compound may also be obtained from the saturated triketo compound of Formula VIII by catalytic hydrogenation in the presence of a platinum catalyst. By partial oxidation, for instance, by means of the Oppenauer method, the 3- and 20-hydroxy groups are oxidized to keto groups to yield compound XIII. Said compound in turn may be converted, by introducing a double bond between the carbon atoms 4 and 5, for instance, by bromination and splitting off hydrogen bromide by means of pyridine, into the 21-monoester of corticosterone of Formula XIV which, on saponification, yields corticosterone of Formula XV.

It is not possible to directly convert the compound of Formula VII to corticosterone of Formula XV by oxidizing compound VII following the Oppenauer method. It is necessary to first produce the triketo compound of Formula XI and to reduce the same to the monoacylated tetrahydroxy compound XII. This is most probably due to the fact that in compound VII the hydroxyl group at carbon atom 11 is attached in α-configuration while the hydroxyl group in 11-position in corticosterone of Formula XV is in β-configuration.

When starting with sarmentogenone and following the aforementioned procedure the same result is obtained as with sarmentogenine.

Subjecting sarmentocymarine or its acyl derivatives to the foregoing procedure yields compounds of Formulas III, IV and V. They may contain, in part, an acyloxy group at carbon atom 11.

In treating carbomethoxy, carbobenzoxy or the like esters of sarmentogenine, according to the foregoing procedure, the ester groups are split off during hydrogenation to yield compounds VI and VII.

Figure 3:
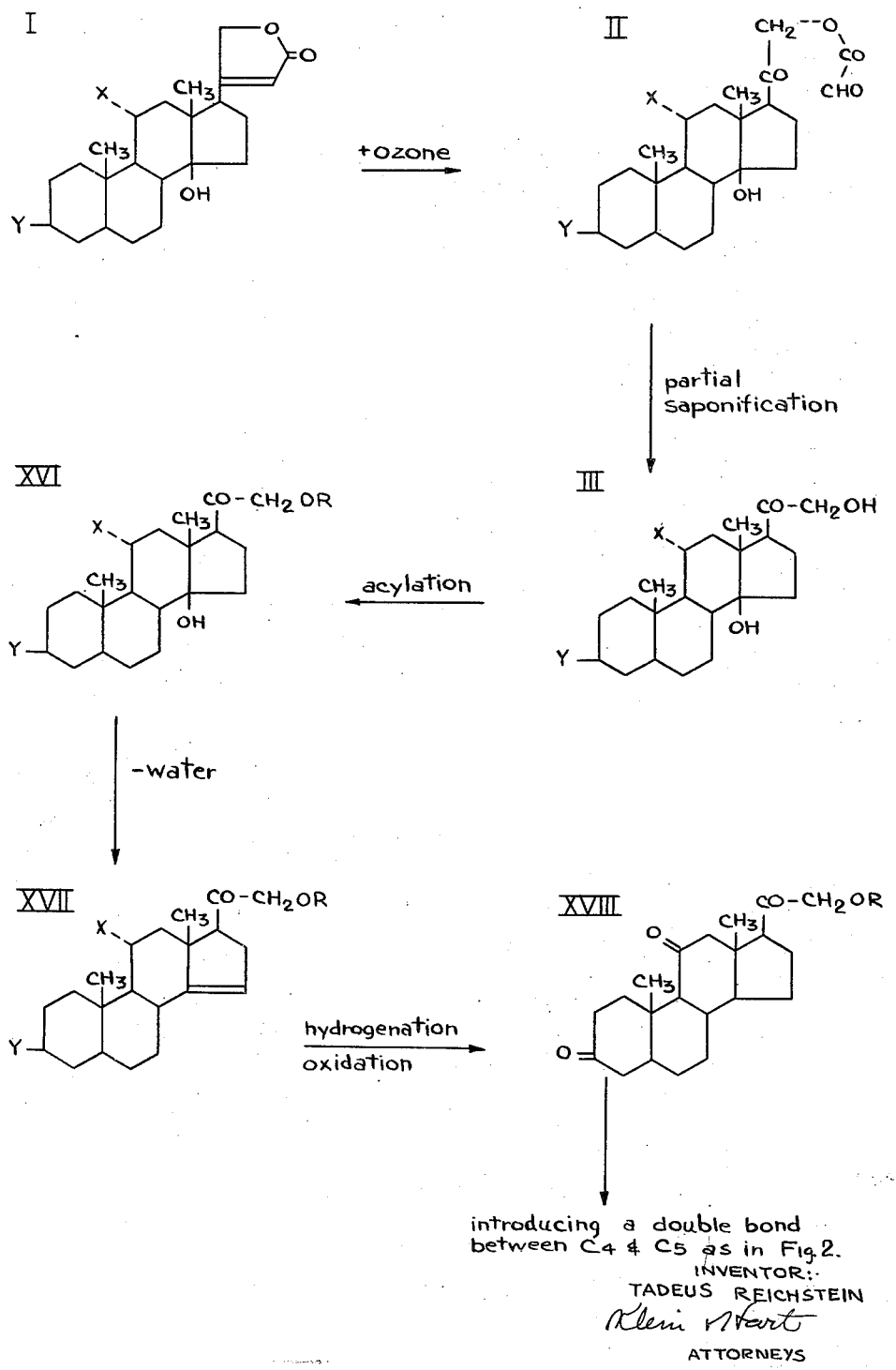

As illustrated in Fig. 3 diesters of sarmentogenine of Formula I, wherein X and Y are acyloxy groups, such as acetoxy, carbomethoxy, benzoyloxy and the like groups are ozonized and split up, for instance, by means of zinc dust in glacial acetic acid, to glyoxylic acid esters of Formula II. By careful saponification, for instance, in methanol with potassium bicarbonate, a ketol diacyl compound of Formula III is obtained which is then acylated to form a 3,11,21-triacyl compound of Formula XVI wherein R represents an acyl residue, such as the residue of a lower fatty acid like acetyl, propionyl, n-butyryl, trimethyl acetyl residues and the like. Said triacyloxy ketone is, thereafter, subjected to the action of an agent capable of splitting off water from the hydroxyl group at carbon atom 14 and the neighboring methylene group, such as phosphorous oxychloride in pyridine, thereby forming the unsaturated triacyloxy ketone XVII. By hydrogenation of compound XVII, for instance, by means of catalytically activated hydrogen in the presence of a platinum catalyst, and subsequent oxidation, for instance, by chromic acid, the saturated triacyloxy compound of Formula XVIII is obtained which may be further worked up into physiologically active adreno-cortical hormones, such as corticosterone, 11-dehydro corticosterone, 17-hydroxy-11-dehydro corticosterone and the like.

It is very surprising that sarmentogenine and compounds derived therefrom can be converted into dehydrocorticosterone, corticosterone, 17-hydroxy-11-dehydro corticosterone and other adreno-cortical hormones having an oxygen linkage at carbon atom 11.

The present application is especially concerned with the production of pregnane compounds of the following formula:

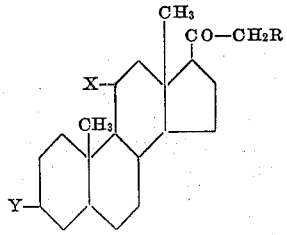

wherein X and Y are substituents selected from the group consisting of hydroxyl groups and groups convertible by hydrolysis into hydroxyl groups, such as lower aliphatic acyloxy groups, carbo-lower alkoxy groups, carbo-benzyloxy groups, benzoyloxy groups, lower alkoxy groups, benzyloxy groups, phenyl substituted methoxy groups, glycosido groups, and the like ester or ether groups, while R is a substituent selected from the group consisting of the hydroxyl group and a group convertible by hydrolysis into a hydroxyl group, such as a lower aliphatic acyloxy group, a carbo-lower alkoxy group, a carbo-benzyloxy group, a benzoyloxy group, and the like ester or ether groups.

The following examples serves to illustrate the present invention without, however, limiting the same thereto.

*Example 1*

1 g. of sarmentogenine of Formula I (X and Y: OH) having a melting point of 265° C. is dissolved in hot ethyl acetate sufficient to cause substantially complete solution. The solution is rapidly cooled to about —80° C. and about 400 cc. of dry oxygen containing about 4.5% of ozone are introduced and passed through said solution within about 20 minutes. Thereafter the blue-violet reaction solution is allowed to stand for 20 minutes at about —80° C. The blue-violet color should not disappear during this period of time. Otherwise further amounts of ozonized oxygen are introduced. Special care must be taken that any contamination of the reaction solution, especially with rubber dust is avoided during ozonization. The ozonized solution is then evaporated to dryness. 10 cc. of glacial acetic acid and 1 g. of zinc dust are gradually added to the residue while shaking vigorously, whereby heat is generated. By externally cooling the reaction mixture, the temperature is maintained between about 30-35° C. As soon as a drop of the solution, placed on a strip of potassium iodide-starch paper, does not cause coloration of said paper strip, the solution is filtered, the filtrate is extracted with chloroform, and the chloroform extract is avaporated to dryness by vacuum distillation. The residue is dissolved in chloroform, the chloroform solution is washed successively with ice-cold water, with a cold aqueous sodium carbonate solution, and again with a small quantity of ice-cold water, dried over anhydrous sodium sulfate, and then evaporated to dryness. 0.91–1.0 g. of a colorless resinous compound are obtained. Said compound exerts a strong reducing effect upon an alkaline solution of silver diamine. This resin is the glyoxylic acid ester of Formula II (X and Y: HO).

Said ester is dissolved in 20 cc. of ethanol and boiled for ½ hour under reflux after addition of 1 cc. of concentrated hydrochloric acid. 10 cc. of water are added, the alcohol is evaporated by vacuum distillation, the aqueous solution is then heated for 10 minutes at about 70° C., cooled and repeatedly extracted with chloroform. The chloroform extract is washed repeatedly with a potassium bicarbonate solution whereby the temperature is maintained at about 0° C. The washed extract is then dried and evaporated to dryness in a vacuum. 0.7 g. of a yellowish glassy mass are obtained representing the crude product of Formula IV.

Said crude product is dissolved in 2.5 cc. of water-free dioxane, 0.4 cc. of pyridine are added thereto. The mixture is cooled to about —20° C. and 0.29 cc. of acetic acid anhydride are added while maintaining the temperature at —20° C. The solution is allowed to stand at about —20° C. for an hour, thereafter at about 0° C. for 16–24 hours, and finally at about 15–20° C. for 1 hour. Care must be taken to exclude thereby any moisture. From the reaction mixture there are isolated 0.8 g. of the crude 21-monoacetate of Formula V by evaporating the solution in a vacuum to dryness. Said crude 21-monoacetate is dissolved in 10 cc. of glacial acetic acid of highest purity. To eliminate any substance poisonous to and inactivating the catalyst, said solution is filtered over activated carbon which previously had been repeatedly washed with hot water and glacial acetic acid of highest purity. 0.2 g. of platinum oxide are added to the filtered solution and the mixture is shaken in a hydrogen atmosphere until at least as much hydrogen is absorbed as is required for saturating the double bond between the carbon atoms 14 and 15 and for reducing the added platinum oxide catalyst. Thereafter, the hydrogenation mixture is filtered and washed with glacial acetic aicd. The hydrogenation products of Formulas VI and VII are not isolated, but their solution is filtered and a solution of 0.4 g. of chromic acid anhydride in 1 cc. of water and 8 cc. of glacial acetic acid is added thereto. The oxidation mixture is allowed to stand for 4 hours at a temperature of 15–20° C. To determine whether all the chromic acid is used up, ether and a few drops of dilute sulfuric acid and of a 10% hydrogen peroxide solution are added to a sample of the reaction solution. The presence of free chromic acid is indicated by a blue coloration of the ether. As soon as all chromic acid has been consumed, more chromic acid solution is added to the oxidation mixture until, after allowing the mixture to stand for another 4 hours, a slight excess of chromic acid is detected. The oxidation mixture is then evaporated in a vacuum to a viscouse liquid concentrate, 100 cc. of water are added thereto, and the mixture is extracted with a large amount of ether. The ethereal extract is successively washed with dilute sulfuric acid and with dilute sodium carbonate solution, and is dried over anhydrous sodium sulfate. After evaporation of the ether, about 0.65 g. of a colorless mass remain which are dissolved in a mixture of benzene-ligroin. Said solution is passed through a chromatographic column of 20 g. of aluminum oxide, the aluminum oxide is eluted with water-free benzene, and, after distilling off the benzene from said eluate, the residue is recrystallized from a mixture of ether and ligroine. Colorless needles of the melting point 151–153° C. are obtained representing 21-acetoxy pregnanetrione-3,11,20 (Formula VIII). Said compound can be converted into 11-dehydrocorticosterone acetate of Formula IX as described in "Helvetica Chimica Acta," vol. 26, page 747 (1943).

*Example 2*

To produce corticosterone, 0.5 g. of 21-acetoxy-pregnanetrione-3,11,20 of Formula VIII obtained according to Example 1, are hydrogenated in 10 cc. of glacial acetic acid in the presence of 75 mg. of platinum oxide until 3 mols of hydrogen are absorbed and gas absorption ceases. A crude product of the Formula XII is isolated therefrom by filtering off the catalyst and evaporating the filtrate in a vacuum to dryness. The resulting residue is a mixture of isomeric trihydroxy compounds. Said mixture is dissolved in 22 cc. of water-free benzene. 4 cc. of acetone and 1.2 g. of pure aluminum phenolate are added to said solution and the mixture is heated at a temperature of about 100° C. for 30 hours. Thereafter, the mixture is diluted with a large amount of ether, the ether solution is repeatedly washed with potassium tartrate solution and subsequently with sodium carbonate solution, dried, and concentrated by evaporation. Phenol is finally removed by careful distillation in a high vacuum. The resulting residue is dissolved in a mixture of benzene and ligroine and the solution is passed through a chromatographic column containing 15 g. of alkali free aluminum oxide. After elution with a benzene-ether mixture containing up to 50% of ether, evaporating the eluate to dryness, and recrystallizing the residue from ether, colorless needles having a melting point of 155–157° C. are obtained. Said compound is the 21-monoacetate of pregnanediol-11,21-dione-3,20 of Formula XIII. It can be converted into corticosterone of Formula XV as described in "Helvetica Chimica Acta," vol. 27, page 1287 (1944).

*Example 3*

0.4 g. of the neutral crude glyoxylic acid ester of Formula II wherein X and Y are hydroxyl groups, are dissolved in 20 cc. of methanol. A cold solution of 0.4 g. of potassium bicaronate in 10 cc. of water are added thereto and the mixture is allowed to stand for 16 hours at 15–20° C. Methanol is then distilled off in a vacuum, the residue is repeatedly extracted, each time with 50 cc. of chloroform, and the combined chloroform solutions are dried. After evaporating the chloroform under reduced pressure, pregnanetetrol-3,11,14,21-one-20 of Formula III, wherein X and Y are hydroxyl groups, is obtained. On recrystallization from acetone, a purified product is obtained which, however, does not show a sharp melting point. Said compound can be worked up in the crude state to corticosterone and the like compounds as described, for instance, in Examples 1 and 2.

*Example 4*

1 g. of sarmentocymarine (Formula I; Y: cymaroside residue, X: OH) is dissolved in 10 cc. of chloroform and 5 cc. of water-free pyridine. The solution is cooled to 0° C. and 2 g. of chloroformic acid benzyl ester are added drop by drop thereto. The mixture is allowed to stand for 5 hours and is then decomposed by the addition of ice. The extract obtained on shaking said decomposed mixture with a mixture of chloroform and ether (4 parts of chloroform and 1 part of ether), is repeatedly washed with ice cold dilute hydrochloric acid and subsequently with sodium carbonate solution and is dried over anhydrous sodium sulfate and evaporated to dryness. 1.8 g. of a crude carbobenzoxy sarmentocymarine (Formula I; Y: cymarosido residue; X: carbobenzoxy residue) are obtained. This compound is ozonized and subsequently worked up as described in Examples 1 and 2, yielding the same compounds.

*Example 5*

Dicarbobenzoxy sarmentogenine of Formula I, wherein X and Y are carbobenzoxy residues, is prepared in the same manner as described in Example 4. This compound is ozonized and subsequently worked up as described in Examples 1 and 2, yielding the same compounds.

*Example 6*

0.2 g. of sarmentogenine of Formula I (X and Y: OH), 1 cc. of water-free pyridine, and 0.8 cc. of acetic acid anhydride are allowed to stand for 16 hours at 20° C. and for 2 hours at 60° C. The reaction mixture is evaporated to dryness in a vacuum at about 40° C. 0.255 g. of crudesarmentogenine diacetate (Formula I; X and Y: acetoxy groups) are obtained. This product is dissolved in ethyl acetate and is ozonized at −80° C. The resulting ozonide is decomposed by reduction with zinc dust and glacial acetic acid as described in Example 1. 0.256 g. of crude glyoxylic acid ester of Formula II (X and Y: acetoxy groups) are obtained.

The crude glyoxylic acid ester is dissolved in 20 cc. of methanol, said solution is added to a solution of 0.25 g. of potassium bicarbonate in 6 cc. of water and the saponification mixture is allowed to stand for 16 hours at 20° C. On working up the saponification mixture as described in Example 1, 0.228 g. of the crude ketol compound of Formula III (X and Y: acetoxy groups) are obtained.

The crude ketol is allowed to stand in 1 cc. of water-free pyridine and 0.8 cc. of acetic acid anhydride at 60° C. for 5 hours. Working up said acetylating mixture as described in Example 1 yields 0.252 g. of the crude triacetate of Formula XVI (X, Y and R: acetoxy groups).

Said crude triacetate is dissolved in 3 cc. of water-free pyridine, 0.6 cc. of phosphorus oxychloride and 0.01 g. of water are added and the mixture is heated in a closed container to 70° C. for 60 hours. On working up the reaction mixture, as described in Example 1, 0.18 g. of a neutral crude $\Delta_{14,15}$-unsaturated triacetate is obtained. It is dissolved in benzene and filtered through a little aluminum oxide. Yield on evaporation of the benzene: 0.174 g. of the unsaturated compound of Formula XVII (X, Y and R: acetoxy groups).

Said compound XVII is dissolved in 5 cc. of glacial acetic acid and is hydrogenated in the presence of 0.04 g. of platinum oxide ($PtO_2.H_2O$) at 20° C. for 1½ hours. About 32 cc. of hydrogen are absorbed, of which about 7.9 cc. are used for reducing the platinum oxide. The hydrogenation mixture is filtered, washed with glacial acetic acid, 1.5 cc. of a 2% chromium trioxide solution in glacial acetic acid are added to the filtrate, and the oxidation mixture is allowed to stand at 20° C. for 16 hours. On working up the oxidation mixture as described in Example 1, 0.167 g. of a crude oxidation product are obtained. On recrystallisation from a mixture of ether and petroleum ether 0.077 g. of crystals having a melting point of 177–181° C. are isolated. The mother liquor is passed through a chromatographic column of 3 g. of aluminum oxide. On eluting the aluminum oxide with water-free benzene and evaporating the eluate to dryness, further 5 mg. of crystals having the same melting point, are obtained. Total yield: 0.082 g. corresponding to 33.6% calculated from sarmentogenine triacetate. The 3,11,21-pregnanetrione-21-acetate of Formula XVIII (R: acetoxy group) is identical with a compound prepared from 3,11-diacetoxy etiocholenic acid by way of the chloride and diazo ketone as is proven by determining the melting point of a mixture of said two compounds. Compound XVIII crystallizes from a mixture of ether and petrol ether in colorless prisms, melting point: 178–181° C., $(\alpha)_D^{18}$: $+60.2°\pm2°$ (c: 1.393 in chloroform).

Example 7

In place of carbobenzoxy sarmentocymarine as used in Example 4 as starting material, there are employed equimolecular amounts of Dicarbethoxy sarmentogenine,
Dicarbomethoxy sarmentogenine, or
Sarmentogenine diformiate.

The procedure is the same as described in said Example 4 or in Examples 1 and 2, respectively, yielding intermediates of Formula III with carbethoxy, carbomethoxy, or formyloxy groups for X and Y which are subsequently worked up to 21-acetoxy-3,11-pregnanediols (Formula VI).

When using said components as starting materials in place of sarmentogenine diacetate and proceeding in the same manner as described in Example 6 the corresponding 3,11,21 - triacyloxy - $\Delta_{14,15}$-pregnenone-20 compounds of Formula XVII are obtained which can be further hydrogenated, oxidized, and worked up as described in said example.

Example 8

When proceeding as described in Example 1 and using, in place of acetic acid anhydride as acylating agent to produce 21-acyloxy compounds of Formula V, equimolecular amounts of Propionic acid anhydride,
n-Valeroyl chloride, or
Benzoyl chloride, the corresponding 21-propionyloxy, n-valeroyloxy, or benzoyloxy-$\Delta_{14,15}$-pregnene-3,11-diol compounds (Formula V) are obtained which are hydrogenated to 21-propionyloxy, n-valeroyloxy, or benzoyloxy pregnane-3,11-diols of Formula VI.

The same acylating agents can be used in place of acetic acid anhydride in the procedure according to Example 6. Thereby 3,11,21-tripropionyloxy, tri-n-valeroyloxy, and tribenzoyloxy pregnane-20-one-14-ol compounds of Formula XVI are obtained. Said compounds can be further worked up to the corresponding $\Delta_{14,15}$-unsaturated compounds and, by hydrogenation, to the corresponding 3,11,21-triacyloxy pregnane-20-one compounds.

Example 9

The procedure is the same as described in Example 4 whereby, however, sarmentocymarine is acylated with equimolecular amounts of benzoyl chloride in place of chloroformic acid benzyl ester.

Example 10

Sarmentocymarine is etherified with triphenyl methyl halogenide yielding the corresponding 11-triphenyl methyl ether of sarmentocymarine. Said ether is then worked up as described in Example 4 and yields the same 21-acyloxy-3,11-dihydroxy pregnane-20-one of Formula VI as obtained according to said example.

Example 11

In place of sarmentogenine diacetate used as starting material in Example 6, there are employed equimolecular amount of armentogenine dimethyl ether. 3,11-dimethoxy-21-acyloxy-$\Delta_{14,15}$-pregnene-20-one is obtained which can be hydrogenated to the corresponding pregnane compound.

Example 12

In place of sarmentocymarine used as starting material in Example 4, there are employed equimolecular amounts of sarmentogenine-3-monoglucoside. The same reaction products are obtained as by proceeding according to said example.

Example 13

2.07 g. of sarmentocymarine (M. P. 212–214° C.) are dissolved in 50 cc. of methanol. The solution is mixed with 50 cc. of N/10 sulfuric acid and the mixture is boiled on the water-bath under reflux for 30 minutes. The methanol is then evaporated in a vacuum, whereby sarmentogenine precipitates. The precipitate is filtered, washed with water, and dried in a vacuum. Yield: 1.63 g. of crystalline sarmentogenine having a melting point of 250–270° C. The filtrate is extracted with chloroform and acetic acid ethyl ester yielding, on evaporation of the solvents, further 40 mg. of crude sarmentogenine.

1.3 g. of sarmentogenine (M. P. 250–270° C.) are dissolved in 6 cc. of pyridine. The solution is mixed with 4 cc. of acetic acid anhydride and the mixture is allowed to stand overnight at 80° C. and thereafter for 2 hours at 60° C. 1.64 g. of the crude acetate are isolated from the reaction mixture. On recrystallisation from acetone-ether, crystals having a melting point of 145–165° C. are obtained therefrom.

1.54 g. of said crude acetate are dissolved in 50 cc. of neutral acetic acid ethyl ester. Into said solution there is introduced dry oxygen containing about 4% of ozone at a rate of about 100 cc. of oxygen per minute and at a temperature of $-80°$ C. After 30 minutes ozonisation is discontinued and the ozonized solution is allowed to stand for 20 more minutes at $-80°$ C. The solution is then evaporated in a vacuum at 30° C. The residue is dissolved in 6 cc. of glacial acetic acid and the solution is shaken at 20–30° C. for about 1 hour. During said period of time small portions of zinc dust are added to the solution. The reaction mixture is filtered, the residue on the filter is washed with ether and the filtrate is evaporated to dryness in a vacuum. The evaporation residue is then dissolved in chloroform, the chloroform solution is washed successively with ice-cold water, with a cold aqueous sodium carbonate solution, and again with a small quantity of ice-cold water, dried over anhydrous sodium sulfate, and then evaporated to dryness.

1.58 g. of the crude glyoxylic acid ester are obtained. Said crude ester is purified by dissolving the same in 100 cc. of methanol. The resulting solution is mixed with 1.2 g. of potassium bicarbonate, dissolved in 35 cc. of water, and is allowed to stand for 16 hours. Thereupon the methanol is evaporated in a vacuum and the residue is dissolved in ether. The ethereal solution is washed with water and dried over anhydrous sodium sulfate. On evaporation to dryness 1.39 g. of crude 3$\beta$,11$\alpha$,14,21-tetrahydroxy-14-isopregnanone-20-diacetate-3,11 are obtained.

225 mg. of said crude diacetate are allowed to stand in 1.5 cc. of pyridine and 1 cc. of acetic acid anhydride at 18° C. for 4 hours and thereafter at 60° C. for 3 hours. 252 mg. of the crude corresponding triacetate are isolated from the reaction mixture.

Said 252 mg. of crude triacetate are dissolved in 33 cc. of pyridine. The solution is mixed with 0.6 cc. of phosphorus oxychloride and a trace of water and is then allowed to stand at 70° C. for 16 hours. Thereupon it is mixed with ice and shaken with ether.

The resulting ethereal solution is washed with water and dried over anhydrous sodium sulfate. On evaporation, 174 mg. of a clear syrupy 3β,11α,21-triacetoxy-Δ14,15-pregnene-20-one are obtained. This product gives a positive reaction with tetranitromethane.

Said sirupy, unsaturated triacetate is dissolved in 5 cc. of glacial acetic acid and 40 mg. of platinum dioxide catalyst ($PtO_2.H_2O$) are added. Hydrogen is passed through said solution while shaking. After 1½ hours, 32 cc. of hydrogen are absorbed (7.3 cc. for hydrogenating the catalyst, 9.4 cc. for hydrogenating the one double bond). The platinum catalyst is filtered off and thoroughly washed with a mixture of chloroform and ether. The filtrate and wash solvents are evaporated to dryness. The residue is disolved in 2 cc. of glacial acetic acid, the solution is mixed with 1.5 cc. of a 2% chromium trioxide solution and the reaction mixture is allowed to stand at 18° C. for 16 hours. 163 mg. of a crude product are isolated from the reaction mixture. They yield, on recrystallisation from ether-petroleum ether, 77 mg. of crystals of 3β,11α,21-triacetoxy pregnane-20-one in the form of prisms having a melting point of 177–181° C. The mother liquors are passed through a chromatographic column of 3 g. of aluminum oxide. Thereby 5 mg. of crystalline 3β,11α,21-triacetoxy pregnane-20-one, having a melting point of 178–181° C., are obtained.

*Example 14*

1.04 g. of sarmentogenine are dissolved in 12 cc. of pyridine. The solution is mixed with 2 cc. of benzoyl chloride at 0° C. and the reaction mixture is allowed to stand for 5 hours at said temperature. Thereafter methanol is added. The mixture is allowed to stand for 30 minutes and is then evaporated to dryness in a vacuum. The residue is dissolved in chloroform, the chloroform solution is washed to neutral reaction, dried over anhydrous sodium sulfate, and evaporated to dryness. The resulting residue is dissolved in a mixture of chloroform and ether and yields 1.42 g. of sarmentogenine dibenzoate having a melting point of 280–285° C.

Said 1.42 g. of sarmentogenine dibenzoate are dissolved in 100 cc. of acetic ethyl ester. The solution is cooled to −80° C. and is ozonized twice for 20 minutes as described in Example 13. Thereafter the solvent is distilled off in a vacuum. The evaporation residue is dissolved in glacial acetic acid. Zinc dust is added to the solution and the ozonized reaction product is split up as described in Example 1. 1.54 g. of the crude glyoxylic acid ester are obtained thereby. The crude product is dissolved in 150 cc. of methanol. A solution of 1.2 g. of potassium bicarbonate in 50 cc. of water is added thereto and the mixture is allowed to stand for 48 hours. The methanol is distilled off in a vacuum. The precipitated crystals are filtered off and washed with water. 1.34 g. of 3β,11α,14,21-tetrahydroxy-14-isopregnane-20-one-3,11-dibenzoate, having a melting point of 190–198° C., are obtained. The filtrate is extracted with chloroform. Thereby an additional amount of 40 mg. of a crude dibenzoate is recovered.

On recrystallisation of said dibenzoate from a mixture of acetone and ether the pure dibenzoate is obtained in granular form. It melts at 200–203° C. Its specific rotation is $[\alpha]_D^{16}: +3.5° \pm 2°$ (c: 1.109 in chloroform).

1.38 g. of the crude dibenzoate (M. P. 190–198° C.) are dissolved in 5 cc. of pyridine and 4 cc. of acetic acid anhydride. The reaction mixture is allowed to stand at room temperature overnight. 1.51 g. of crude dibenzoate acetate are isolated from said reaction mixture. On repeated recrystallisation from methanol and thereafter from a mixture of ether and methanol, crystals of 3β,11α,14,21 - tetrahydroxy - 14 - isopregnane - 20 - one - 3,11,-dibenzoate-21-acetate (thick small discs) are obtained which melt at 142–150° C. The specific rotation of said compound is $[\alpha]_D^{18}: +12.4° \pm 1.5°$ (c: 1.612 in chloroform).

430 mg. of said dibenzoate acetate (M. P. 130–140° C.) are dissolved in 5 cc. of pyridine. The pyridine solution is mixed with 1.2 cc. of phosphorus oxychloride and a trace of water. The reaction mixture is allowed to stand at 60° C. for 3 days. Thereupon it is mixed with ice and extracted with ether. 355 mg. of Δ14,15-unsaturated dibenzoate acetate are isolated from the ethereal solution. Said compound is hydrogenated without further purification. Said 355 mg. are dissolved in 10 cc. of acetic acid ethyl ester containing 0.2 cc. of glacial acetic acid. To this solution there are added 40 mg. of platinum dioxide catalyst ($PtO_2.H_2O$) and hydrogen is passed through the mixture while shaking. 22.4 cc. of hydrogen are absorbed within 1¾ hours (calculated 21.4 cc.). 330 mg. of the crude 3β,11α,21-trihydroxy pregnane-20-one-3,11-dibenzoate-21-acetate are isolated from the ethereal solution. The crude compound is recrystallized from a mixture of ether and petroleum ether whereby 85 mg. of a crystalline product are obtained. The residue obtained from the mother liquors of this recrystallization (which yield 35 mg. of crystalline compound) are dissolved in 15 cc. of acetic acid ethyl ester and 0.5 cc. of glacial acetic acid. 40 mg. of the above mentioned platinum catalyst are added and the reaction mixture is hydrogenated for 5 hours whereby 54 cc. of hydrogen are absorbed. On working up the hydrogenation mixture 280 mg. of the saturated dibenzoate acetate are obtained.

365 mg. of said crude product (crystals and mother liquor product combined) are dissolved in 3 cc. of glacial acetic acid and mixed with 3 cc. of a 2% chromium trioxide solution in glacial acetic acid. The mixture is allowed to stand overnight at room temperature. 330 mg. of a considerably purer product are obtained which, however, must be further purified by chromatographic treatment on 10 g. of aluminum oxide. The benzene-petroleum ether eluates obtained thereby, on evaporation, yield 150 mg. of a crude product having a very unsharp melting point. Fractions which are obtained by elution with benzene-petroleum ether and with benzene alone, yield after recrystallisation from acetone-petroleum ether, 70 mg. of crystalline 3β,11α,21-trihydroxy pregnane-20-one-3,11-dibenzoate-21-acetate. Its specific rotation is $$[\alpha]_D^{18}: +34.6° \pm 2°$$

(c: 1.068 in chloroform).

I claim:

1. In a process of preparing adrenocortical hormones characterized by a $C_{11}$-oxygen linkage, and derivatives thereof, the steps comprising oxidizing, by means of ozone, compounds of the formula

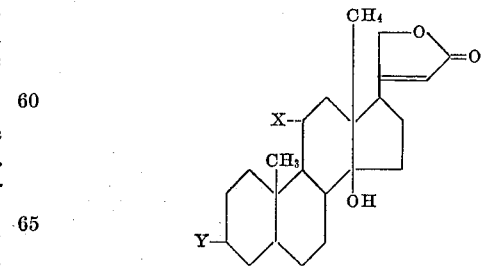

wherein X and Y are substituents selected from the group consisting of hydroxyl groups, lower alkanoyloxy groups, carbo-lower alkoxy groups, carbo-benzyloxy groups, benzoyloxy groups, lower alkoxy groups, benzyloxy groups, phenyl substituted methoxy groups, glycosido groups, keto groups, hydrazono groups, semicarbazono groups, and thiosemicarbazono groups saponifying the resulting oxidation product to form a —CO—CH2OH side chain at carbon atom 17, splitting off water to form a double bond between carbon atoms 14 and 15, converting the —CO—CH2OH side chain into a —CO—CH2R side chain wherein R is a substituent selected from the group consisting of a hydroxyl group, a lower alkanoyloxy group, and a benzoyloxy group, and hydrogenating the double bond between carbon atoms 14 and 15.

2. In a process of producing adrenocortical hormones characterized by a C11-oxygen linkage, the steps comprising oxidizing, by means of ozone, compounds of the formula:

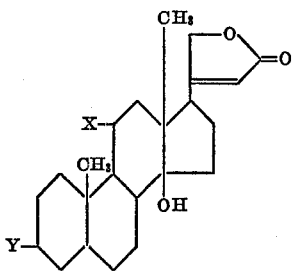

wherein X and Y are substituents selected from the group consisting of hydroxyl groups, lower alkanoyloxy groups, carbo-lower alkoxy groups, carbo-benzyloxy groups, benzoyloxy groups, lower alkoxy groups, benzyloxy groups, phenyl substituted methoxy groups, glycosido groups, keto groups, hydrazono groups, semicarbazono groups, and thiosemicarbazono groups saponifying the resulting oxidation product to form a —CO—CH2OH side chain at carbon atom 17, converting the —CO—CH2OH side chain into a —CO—CH2R side chain wherein R is a substituent selected from the group consisting of a lower alkanoyloxy group and a benzoyloxy group, splitting off water from the resulting —CO—CH2R compound to form a double bond between carbon atoms 14 and 15, and hydrogenating the double bond between carbon atoms 14 and 15.

3. In a process of producing adrenocortical hormones characterized by a C11-oxygen linkage, the steps comprising oxidizing sarmentogenine diacetate by means of ozone to split the double bond in ring E, saponifying the resulting oxidation product to form a —CO—CH2OH side chain at carbon atom 17, converting said —CO—CH2OH side chain into a —CO—CH2R side chain wherein R is a lower alkanoyloxy group, splitting off water from the resulting —CO—CH2R compound to form a double bond between carbon atoms 14 and 15, and hydrogenating said double bond between carbon atoms 14 and 15.

4. In a process of producing adrenocortical hormones characterized by a C11-oxygen linkage, the steps comprising oxidizing sarmentogenine dibenzoate by means of ozone to split the double bond in ring E, saponifying the resulting oxidation product to form a —CO—CH2OH side chain at carbon atom 17, converting said —CO—CH2OH side chain into a —CO—CH2R side chain wherein R is a lower alkanoyloxy group, splitting off water from the resulting —CO—CH2R compound to form a double bond between carbon atoms 14 and 15, and hydrogenating said double bond between carbon atoms 14 and 15.

5. In a process of producing adrenocortical hormones characterized by a C11-oxygen linkage, the step comprising hydrogenating the double bond in a $\Delta_{14,15}$-pregnane compound of the formula

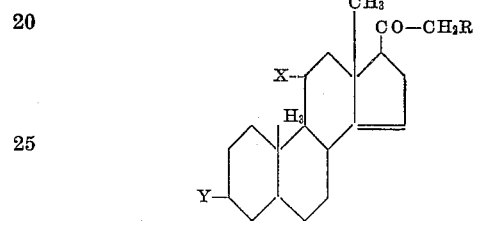

wherein X and Y are substituents selected from the group consisting of hydroxyl groups, lower alkanoyloxy groups, carbo-lower alkoxy groups, carbo-benzyloxy groups, benzoyloxy groups, lower alkoxy groups, benzyloxy groups, phenyl substituted methoxy groups, glycosido groups, keto groups, hydrazono groups, semicarbazono groups, and thiosemicarbazono groups, and R is a substituent selected from the group consisting of a hydroxyl group, a lower alkanoyloxy group, and a benzoyloxy group, to form the corresponding pregnane compound.

References Cited in the file of this patent
FOREIGN PATENTS
594,878    Great Britain _____ Nov. 21, 1947

OTHER REFERENCES
Callow: Jour. Chem. Soc., 1952, 2299–2304.